United States Patent [19]
Nakamura

[11] Patent Number: 6,047,136
[45] Date of Patent: Apr. 4, 2000

[54] DISTANCE METER AND AN APPARATUS HAVING A DISTANCE METER

[75] Inventor: Kenji Nakamura, Kasai, Japan

[73] Assignee: Minolta Co., Ltd., Osaka, Japan

[21] Appl. No.: 09/110,123

[22] Filed: Jul. 6, 1998

[30] Foreign Application Priority Data

Jul. 3, 1997 [JP] Japan ..................................... 9-178590

[51] Int. Cl.⁷ .................................................. G03B 13/36
[52] U.S. Cl. ........................ 396/128; 356/3.14; 250/201.8
[58] Field of Search .................... 396/128, 125, 396/89; 250/201.8; 356/3.14

[56] References Cited

U.S. PATENT DOCUMENTS

| | | | |
|---|---|---|---|
| 4,636,624 | 1/1987 | Ishida et al. | 250/201.8 |
| 5,134,526 | 7/1992 | Inabata | 250/201.8 X |
| 5,155,347 | 10/1992 | Nishibe | 396/128 X |

*Primary Examiner*—W. B. Perkey
*Attorney, Agent, or Firm*—Burns, Doane, Swecker & Mathis, LLP

[57] ABSTRACT

An apparatus includes a detecting device provided with a first sensor having an arrayed pixels and a second sensor having an arrayed pixels, a selector for selecting predetermined pixels within the first and second sensors, a controller for controlling the selector so that, in a first situation, selected pixels of the first sensor is fixed and selected pixels of the second sensor is shifted by one pixel, and, in a subsequent second situation, selected pixels of the second sensor is fixed and selected pixels of the first sensor is shifted by one pixel, and a calculator for calculating correlation based on the outputs from the selected pixels, and calculates an object distance based on the calculated correlation.

20 Claims, 14 Drawing Sheets

FIG. 4A
FIG. 4B
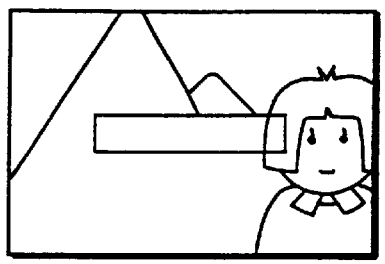
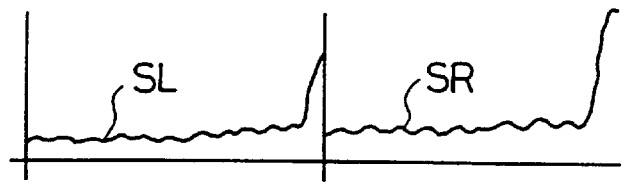

DISTANCE METER AND AN APPARATUS HAVING A DISTANCE METER

This application is based on patent application No. 9-178590 filed in Japan, the contents of which is hereby incorporated by reference.

BACKGROUND OF THE INVENTION

This invention relates to a distance meter which is used in cameras or the like apparatus to measure a distance to an object. This invention also relates to a camera or the like apparatus having such distance meter.

In the distance metering, there have been known distance meters which measure a distance to an object by the so-called "passive method". Such a known distance meter is described with reference to FIG. 14. This distance meter is provided with an optical system and a line sensor arranged behind it, and rays of light coming from an object pass through lenses 51L, 51R. The rays having passed through the lenses 51L, 51R are reflected by mirrors 52L, 52R at right angles with respect to optical axes to be directed to line sensors 54L, 54R in which light receiving elements corresponding to a specified number of pixels are arrayed. The rays reflected by reflecting surfaces 53L, 53R of a prism 53 are focused as an object image on the sensing surfaces of the line sensors 54L, 54R by the focusing action of the lenses 51L, 51R. The object images focused on the sensing surfaces of the line sensors 54L, 54R are photoelectrically converted by the line sensors 54L, 54R into left and right image signals, respectively.

The left and right image signals obtained by the line sensors 54L, 54R are converted into left and right data series by an analog-to-digital (A/D) converter or the like, respectively. Some of the left and right data are extracted by a data extractor 55. A correlation calculator 56 correlates extracted pixel data to one another to obtain a sequence of correlation values. Thereafter, a distance calculator 57 calculates distance data corresponding to the position where the correlation value is at minimum within the obtained sequence, and a drive signal generator 58 generates a drive signal based on the obtained distance data.

However, data for correlation is extracted in a single fixed shifting manner. Consequently, there has been the likelihood that satisfactory accuracy cannot be attained when metering a distance to a particular object. Specifically, a wrong correlation value is likely to be judged as a minimum correlation value in the case of metering a distance to an object having a repetition pattern image or a distance to an object locating in an end of line sensors.

SUMMARY OF THE INVENTION

It is an object of the present invention to provide a distance meter and/or an apparatus having a distance meter which have overcome the problems residing in the prior art.

According to an aspect of the invention, an apparatus comprises: a detecting device which includes a first sensor having an arrayed pixels and a second sensor having an arrayed pixels; a selector which selects predetermined pixels within the first and second sensors; a controller which controls the selector so that a first shift manner and a second shift manner are alternately repeated, wherein the first shift manner is so executed that selected pixels of the first sensor is fixed and selected pixels of the second sensor is shifted by one pixel, and a second shift manner is so executed that selected pixels of the second sensor is fixed and selected pixels of the first sensor is shifted by one pixel, wherein the controller controls the selector so that the selector starts the repetition with the first manner in a first situation, and the selector starts the repetition with the second manner in a second situation; and a calculator which calculates correlation based on the outputs from the selected pixels, and calculates an object distance based on the calculated correlation.

According to another aspect of the invention, an apparatus comprises: a detecting device which includes a first sensor having an arrayed pixels and a second sensor having an arrayed pixels; a selector which selects predetermined pixels within the first and second sensors; a controller which controls the selector so that, in a first situation, selected pixels of the first sensor is fixed and selected pixels of the second sensor is shifted by one pixel, and, in a subsequent second situation, selected pixels of the second sensor is fixed and selected pixels of the first sensor is shifted by one pixel; and a calculator which calculates correlation based on the outputs from the selected pixels, and calculates an object distance based on the calculated correlation.

These and other objects, features and advantages of the present invention will become more apparent upon a reading of the following detailed description and accompanying drawings.

BRIEF DESCRIPTION OF THE DRAWINGS

FIG. 4A is a diagram showing an exemplary image frame in the case that a main object is located at a right end of a sensing area of each sensor;

FIG. 4B is a chart showing waveforms of object images of FIG. 4A obtained by the sensors;

DETAILED DESCRIPTION OF THE PREFERRED EMBODIMENTS OF THE INVENTION

Figure 1:
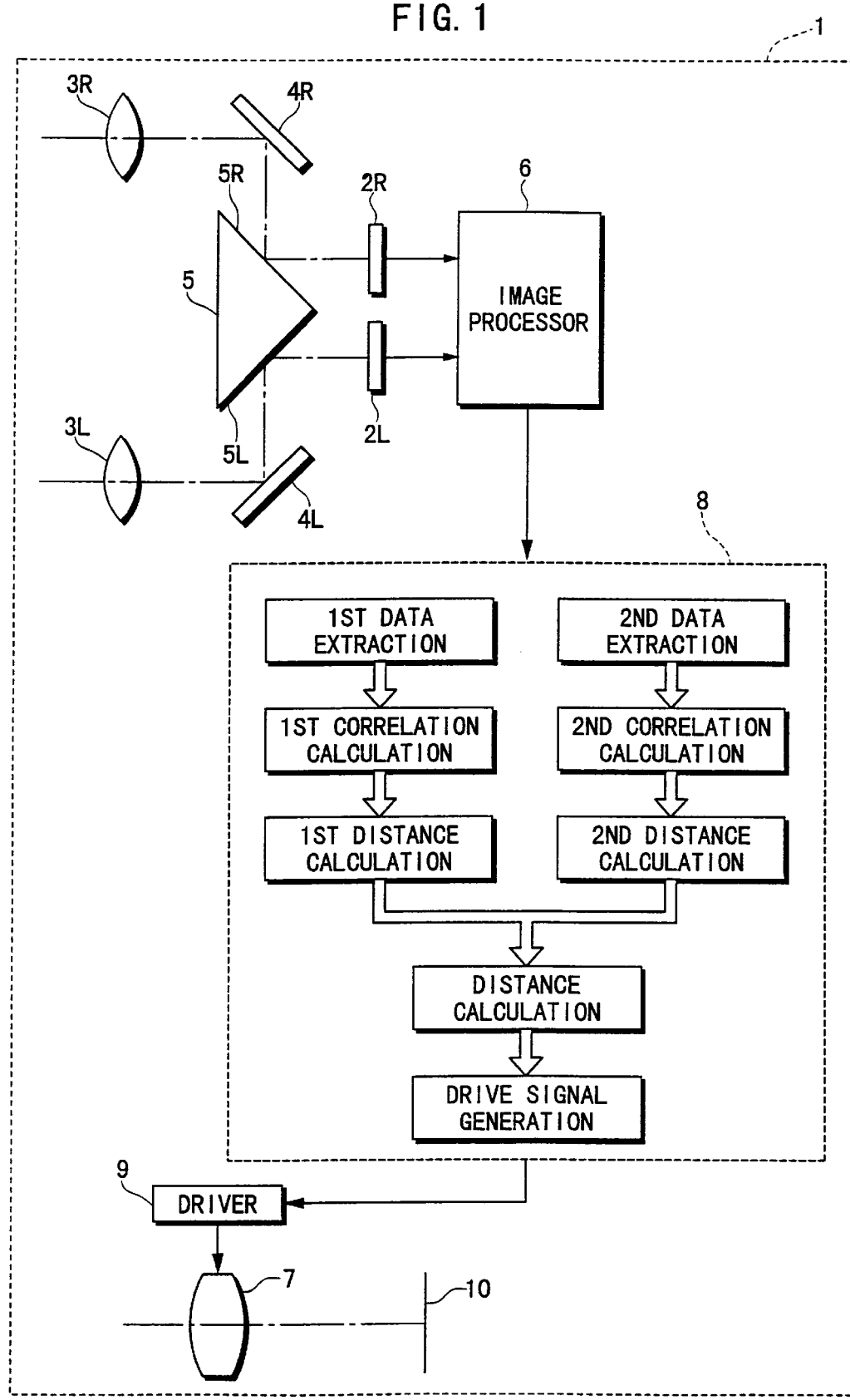
FIG. 1 is a diagram showing a construction of an image pickup apparatus embodying the invention, the image pickup apparatus being provided with a distance meter.

Referring to FIG. 1 showing a construction of an image pickup apparatus embodying the invention. An image pickup apparatus 1 is provided with an image pickup portion and a distance meter.

First, the distance meter is described. Sensors 2L, 2R include CCD (Charge Coupled Device) line sensors in which light receiving elements corresponding to a specified number (twenty in this embodiment) of pixels are arrayed in a line, and are adapted to photoelectrically convert object images focused on their sensing surfaces into image signals. The sensors 2L, 2R are accommodated in the image pickup apparatus 1 while being spaced apart from each other by a specified distance.

In front of the sensors 2L, 2R are arranged corresponding optical systems. Specifically, lenses 3L, 3R focus rays of light coming from the same object on the sensing surfaces of the sensors 2L, 2R arranged behind, and have optical axes parallel to that of a taking lens 7 to be described later. Mirrors 4L, 4R reflect the rays having passed through the lenses 3L, 3R at right angles with respect to the optical axes. On the surface of a prism 5 are formed reflecting surfaces 5L, 5R for reflecting the rays reflected by the mirrors 4L, 4R at right angles with respect to the optical axes.

An image processor 6 includes an analog processing circuit for applying signal processings such as signal amplification and offset adjustment to the image signals obtained by the photoelectric conversion by the sensors 2L, 2R, an AD converter for converting pixel signals of twenty pixels included in the processed image signals into digital signals (pixel data), and the like.

Indicated at 8 is a microprocessor unit (MPU) for calculating distance data corresponding to a distance between the image pickup apparatus 1 and the object based on the image signals (hereinafter, the image signals obtained by the sensor 2L, 2R are referred to as left and right image signals, respectively) processed by the image processor 6, and generating a drive signal to move the taking lens 7.

Next, the image pickup portion is described. The taking lens 7 includes a lens group as an image pickup optical system, and is adapted to focus the rays coming from the object on a predetermined focusing position as an object image.

A driver 9 includes a motor for moving the taking lens 7, and a motor driving circuit for driving the motor, and is adapted to move the taking lens 7 by driving the motor in accordance with a drive signal generated by the MPU 8 to focus the rays from the object which have passed through the taking lens 7 to the predetermined focusing position as an object image.

Indicated at 10 is a photosensitive film arranged in this focusing position. Instead of the film 10, there may be provided a CCD area sensor or like image pickup device whose sensing surface is arranged in the focusing position and a recording device for recording image information obtained by the image pickup device in a storage medium such as a magnetic tape or a magnetic or magneto-optical disk or a storage device such as a semiconductor storage device including a RAM and a memory card.

Rays coming from an object to the image pickup apparatus 1 pass through the lenses 3L, 3R. The rays having passed through the lenses 3L, 3R are reflected at right angles with respect to the optical axes by the mirrors 4L, 4R to be directed to the prism 5. The rays reflected by the mirrors 4L, 4R are reflected at right angles with respect to the optical axes by the reflecting surfaces 5L, 5R of the prism 5 to be directed to the sensors 2L, 2R. The rays reflected by the reflecting surfaces 5L, 5R of the prism 5 are focused as object images on the sensing surfaces of the sensors 2L, 2R by the focusing action of the lenses 3L, 3R. Images of the object focused on the sensing surfaces of the sensors 2L, 2R are photoelectrically converted by the sensors 2L, 2R into left and right image signals. Although the image focused on the sensing surface of the sensor is a part of the actual object, i.e., line images focused on the light receiving elements corresponding to twenty pixels arrayed in a line, these line images are hereinafter referred to as "object image" to simplify the description.

The left and right image signals are applied with signal processings such as signal amplification and offset adjustment by the analog processing circuit in the image processor 6. Thereafter, the respective pixel signals included in the left and right image signals processed are converted into digital signals (pixel data) by the AD converter in the image processor 6.

Next, distance calculation performed by the MPU 8 is described. The MPU 8 executes distance calculations in accordance with a loaded operation program concerning distance calculation. The pixel data obtained by the sensor 2L and those obtained by the sensor 2R are referred to as left and right data series SL and SR, respectively. These data series SL, SR are stored in a memory such as a buffer in the image pickup apparatus 1.

Figure 2:
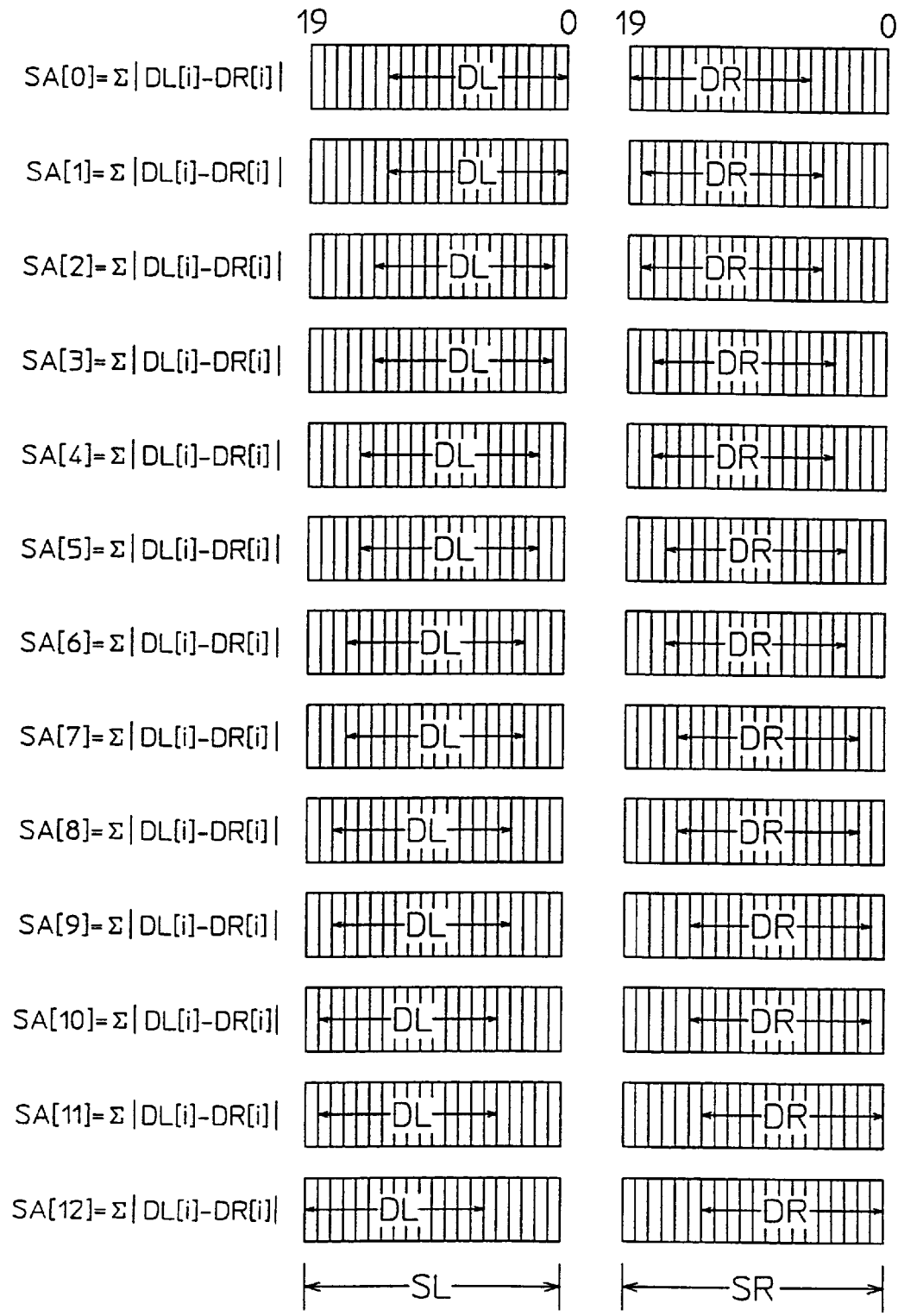
FIG. 2 is a diagram showing a manner of calculating a first correlation value sequence SA[k]($0 \leq k \leq 12$)

A: Calculation of First Correlation Value Sequence SA[k] ($0 \leq k \leq 12$):

Calculation of a first correlation value sequence SA[k] ($0 \leq k \leq 12$) is described with reference to FIG. 2.

1. First Data Extraction

The MPU 8 operates a first address designation to successively generate a left pixel address sequence (0,0,1,1,2,2,3,3,4,4,5,5,6) and a right pixel address sequence (6,5,5,4,4,3,3,2,2,1,1,0,0) different from the left pixel address sequence at the same time. The respective pixel addresses AL of the left pixel address sequence are used as start addresses for designating an arbitrary pixel in the left data series SL, whereas the respective pixel addresses AR of the right pixel address sequence are used as start addresses for designating an arbitrary pixel in the right data series SR.

The MPU 8 may successively generate the respective elements of the left and right pixel address sequences in accordance with a specified operation rule or may generate the left and right pixel addresses AL, AR by successively reading the respective elements from predetermined and stored left and right pixel address sequences.

The MPU 8 generates the left pixel address AL of "0" and the right pixel address AR of "6" at the same time in an initial stage.

The MPU 8 operates a first data extraction to extract data series DL, DR constituted by the pixel data of fourteen pixels from the left and right data series SL, SR in accordance with the left and right pixel addresses AL, AR designated by the first address designation.

For example, in the initial stage, a data series in the pixel addresses of 0 to 13 is extracted as the data series DL in accordance with the left pixel address AL of "0", and a data series in the pixel addresses of 6 to 19 is extracted as the data series DR in accordance with the right pixel address AR of "6".

2. Calculation of First Correlation Values SA[k] ($0 \leq k \leq 12$)

The MPU 8 operates a first correlation calculation to calculate a first correlation value SA[k](k=0) by Equation (1) using the pixel data DL(i) and DR(i) which are extracted in the i-th place ($0 \leq i \leq 13$) from the extracted data series DL, DR. It should be noted that letters in the parentheses [i], [k] are subscripts.

$$SA[k] = \sum_{i=0}^{13} |DL[i] - DR[i]| \qquad (1)$$

The MPU 8 subsequently generates the remaining left and right pixel address sequences (0,1,1,2,2,3,3,4,4,5,5,6) and (6,5,5,4,4,3,3,2,2,1,1,0,0) at the same time to extract data series DL, DR from the left and right data series SL, SR every time the remaining left and right pixel addresses AL, AR are designated by the first address designation. Subsequently, the MPU 8 operates the first correlation calculation to calculate a first correlation value SA[k].

In this way, a total of thirteen first correlation values SA[k]($0 \leq k \leq 12$) are calculated.

B: Calculation of Second Correlation Value Sequence SB[k] ($0 \leq k \leq 12$)

Figure 3:
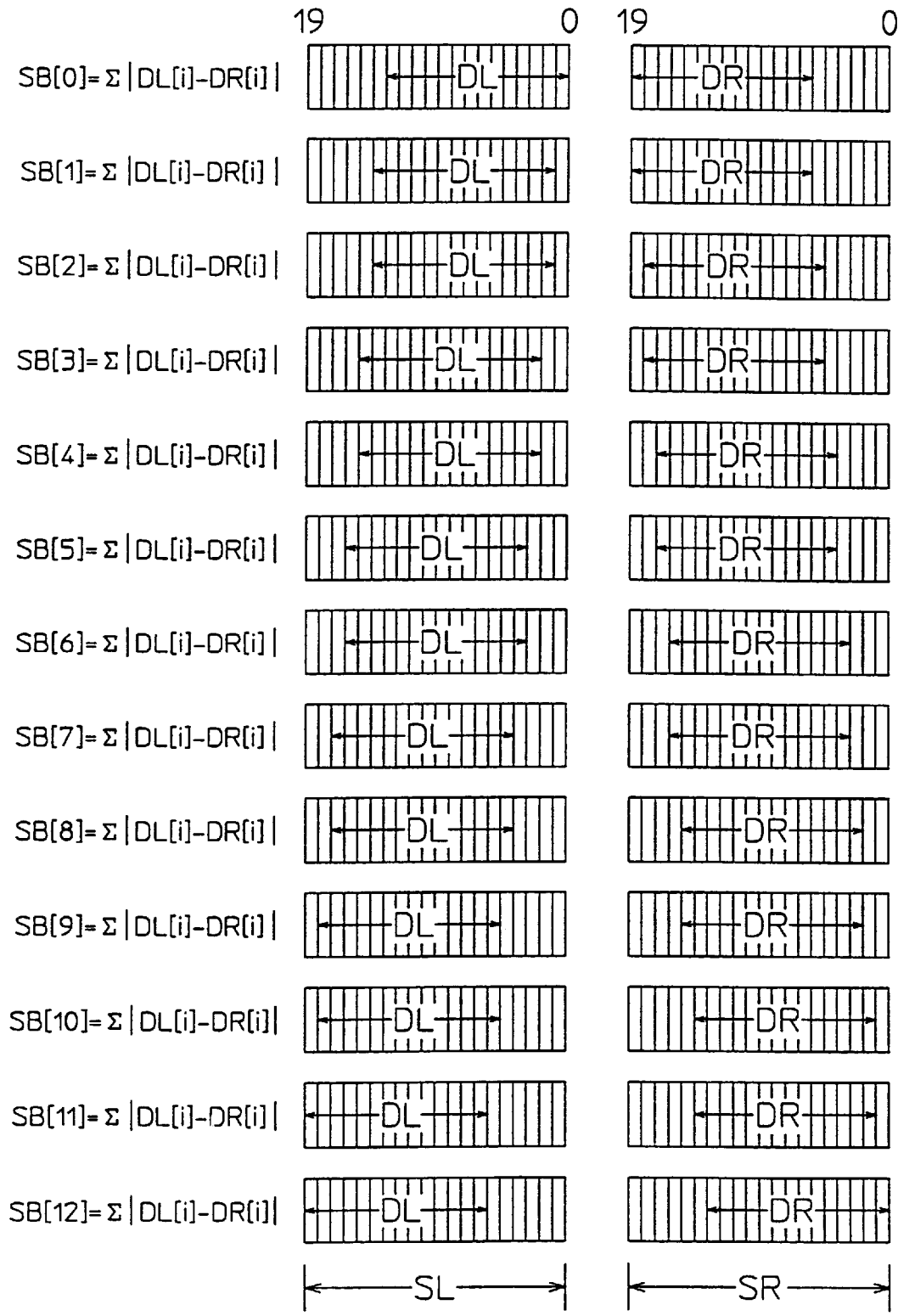
FIG. 3 is a diagram showing a manner of calculating a second correlation value sequence SB[k]($0 \leq k \leq 12$)

Calculation of a second correlation value sequence SB[k] ($0 \leq k \leq 12$) is described with reference to FIG. 3.

1. Second Data Extraction

The MPU 8 operates a second address designation to successively generate a left pixel address sequence (0,1,1,2,2,3,3,4,4,5,5,6,6) and a right pixel address sequence (6,6,5,5,4,4,3,3,2,2,1,1,0) different from the left pixel address sequence at the same time. The left and right pixel address sequences generated by the second address designation are so set as to include elements different from those of the left and right address sequences generated by the first address designation. In this embodiment, the setting is such that even-numbered elements counted from the leading one are different.

In the initial stage, the MPU 8 generates the left pixel address AL of "0" and the right pixel address AR of "6" at the same time.

2. Calculation of Second Correlation Values SB [k] ($0 \leq k \leq 12$)

The MPU 8 operates a second data extraction to extract data series DL, DR constituted by the pixel data of fourteen pixels from the left and right data series SL, SR in accordance with the left and right pixel addresses AL, AR designated by the second address designation.

Subsequently, the MPU 8 operates a second correlation calculation to calculate a second correlation value SB[k](k= 0) by Equation (2) using the pixel data DL(i) and DR(i) which are extracted in the i-th place ($0 \leq i \leq 13$) from the extracted data series DL, DR:

$$SB[k] = \sum_{i=0}^{13} |DL[i] - DR[i]| \qquad (2)$$

Subsequently, the MPU 8 operates the second address designation to successively generate the remaining left and right pixel address sequences (1,1,2,2,3,3,4,4,5,5,6,6) and (6,5,5,4,4,3,3,2,2,1,1,0) at the same time to successively extract data series DL, DR from the left and right data series SL, SR. Thereafter, the MPU 8 operates the second correlation calculation to calculate second correlation values SB[k].

In this way, a total of thirteen second correlation values SB[k]($0 \leq k \leq 12$) are calculated.

Differences between the first correlation value sequence SA[k]($0 \leq k \leq 12$) and the second correlation value sequence SB[k]($0 \leq k \leq 12$) are described with reference to FIGS. 4A to 7B showing a specific example. In the case of an image frame in which a main object is located at right ends of sensing areas of the sensors 2L, 2R as shown in FIG. 4A, waveforms having a distinctive contrast appear at the right ends of the data series DL, DR as shown in FIG. 4B.

Figure 5A:
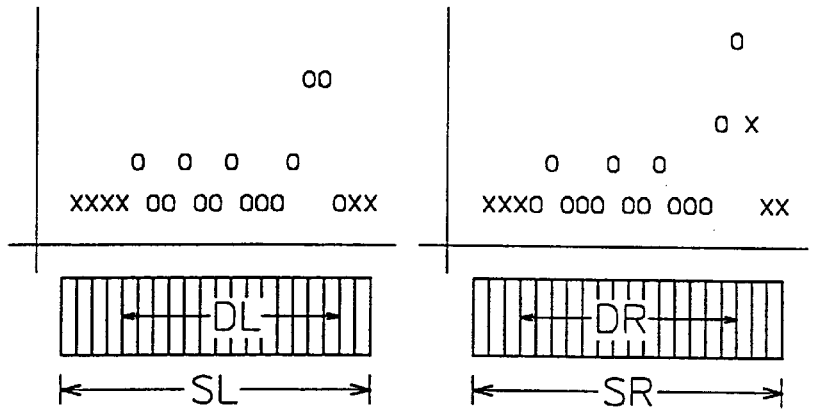
FIGS. 5A to 5D are charts showing pixel data included in data series DL, DR extracted by a first data extraction in the case of FIG. 4A.
Figure 5B:
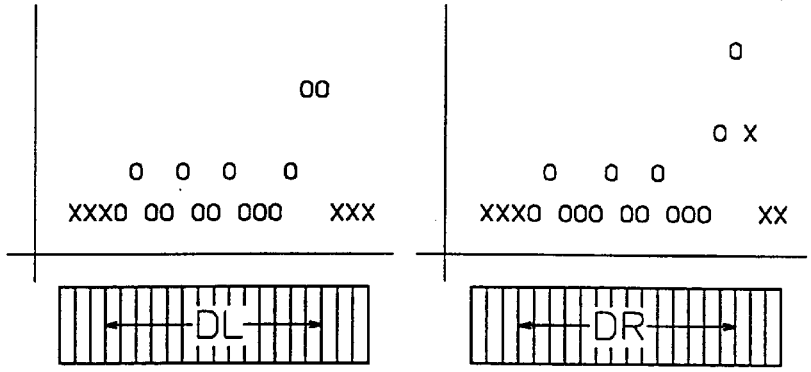
Figure 5C:
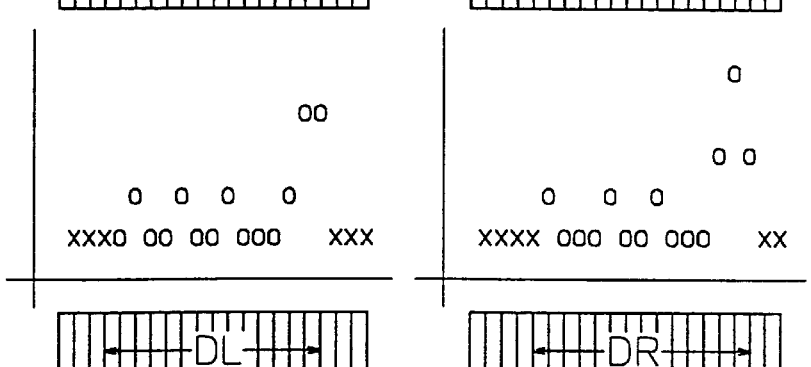
Figure 5D:
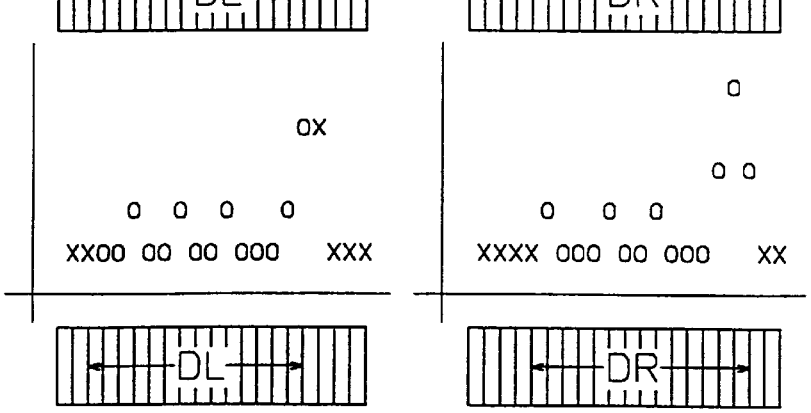

FIGS. 5A to 5D are charts showing the left and right data series SL, SR and the respective pixel data of the data series DL, DR extracted by the first data extraction which are expressed in a level direction in the case of FIG. 4A. The respective pixel data included in the data series DL, DR are represented by the mark "α", and other pixel data are represented by the mark "X". FIG. 5A shows the data series DL, DR used to calculate the first correctional value SA[5]; FIG. 5B shows the data series DL, DR used to calculate the first correctional value SA[6]; FIG. 5C shows the data series DL, DR used to calculate the first correctional value SA[7]; and FIG. 5D shows the data series DL, DR used to calculate the first correctional value SA[8].

Figure 6A:
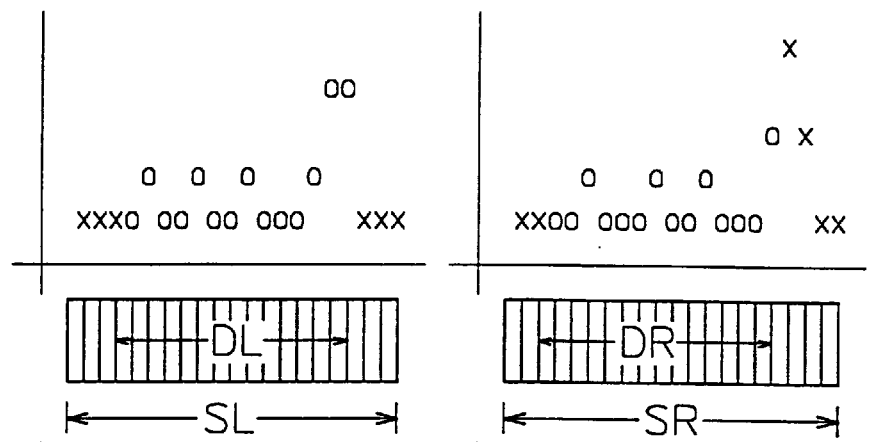
FIGS. 6A to 6D are charts showing pixel data included in data series DL, DR extracted by a second data extraction in the case of FIG. 4A.
Figure 6B:
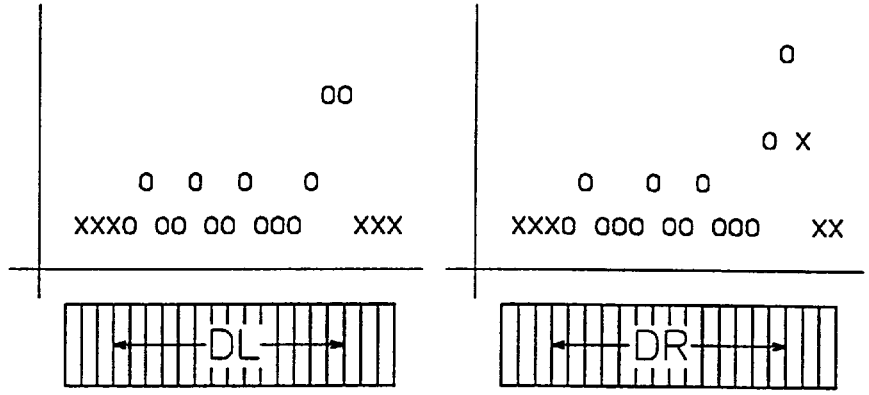
Figure 6C:
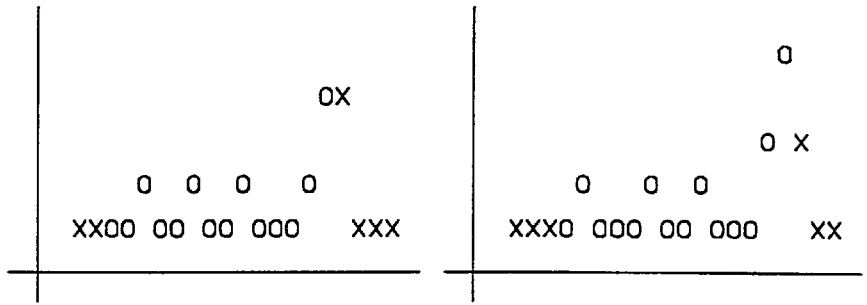
Figure 6D:
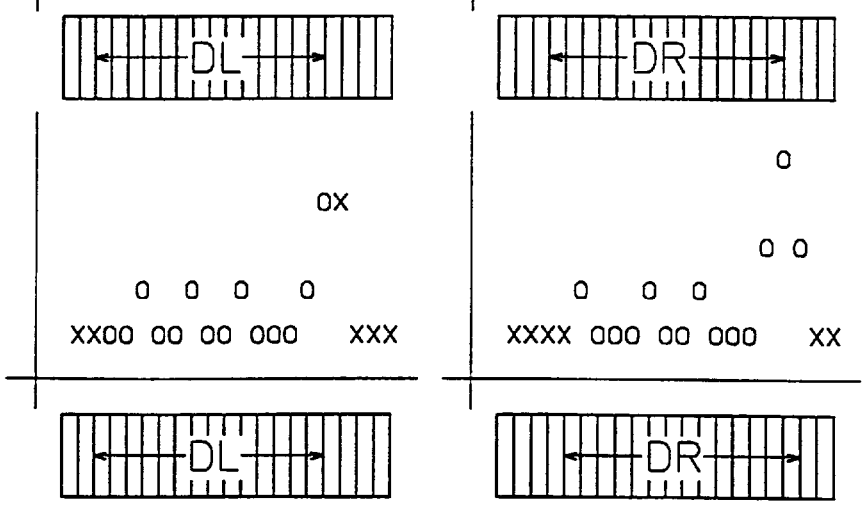

FIGS. 6A to 6D are charts showing the left and right data series SL, SR and the respective pixel data of the data series DL, DR extracted by the second data extraction which are expressed in a level direction in the case of FIG. 4A. The respective pixel data included in the data series DL, DR are represented by the mark "○", and other pixel data are represented by the mark "X". FIG. 6A shows the data series DL, DR used to calculate the second correctional value SB[5]; FIG. 6B shows the data series DL, DR used to calculate the second correctional value SB[6]; FIG. 6C shows the data series DL, DR used to calculate the second correctional value SB[7]; and FIG. 6D shows the data series DL, DR used to calculate the second correctional value SB[8].

Figure 7A:
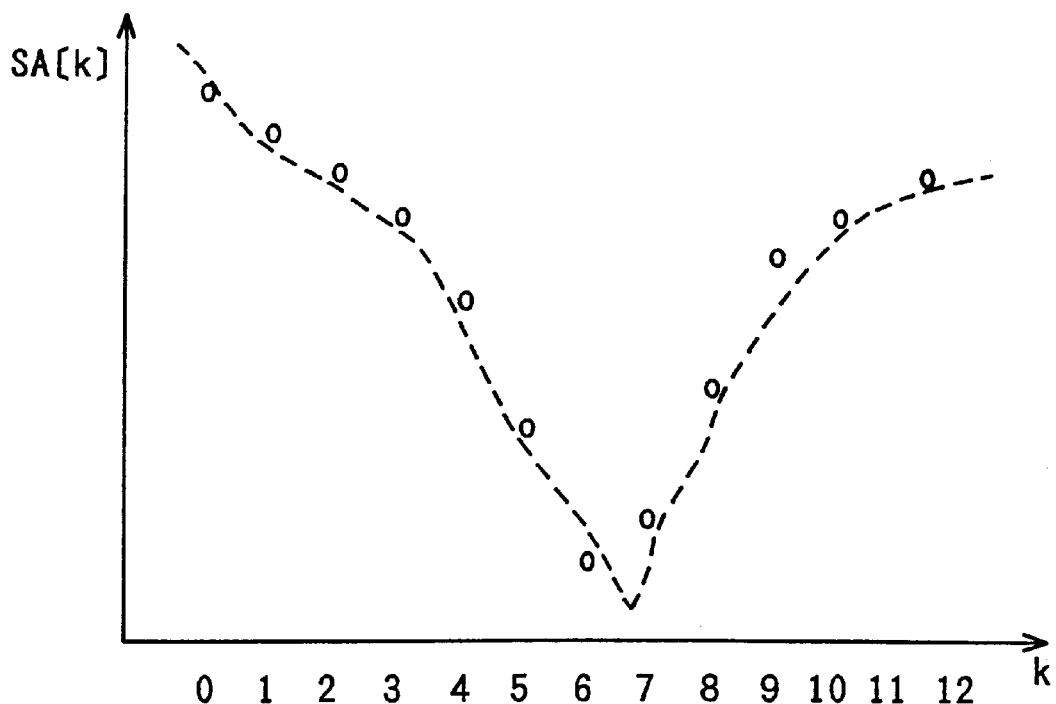
FIGS. 7A and 7B are graphs showing a first correlation value sequence SA[k]($0 \leq k \leq 12$) and a second correlation value sequence SB[k]($0 \leq k \leq 12$), respectively.
Figure 7B:
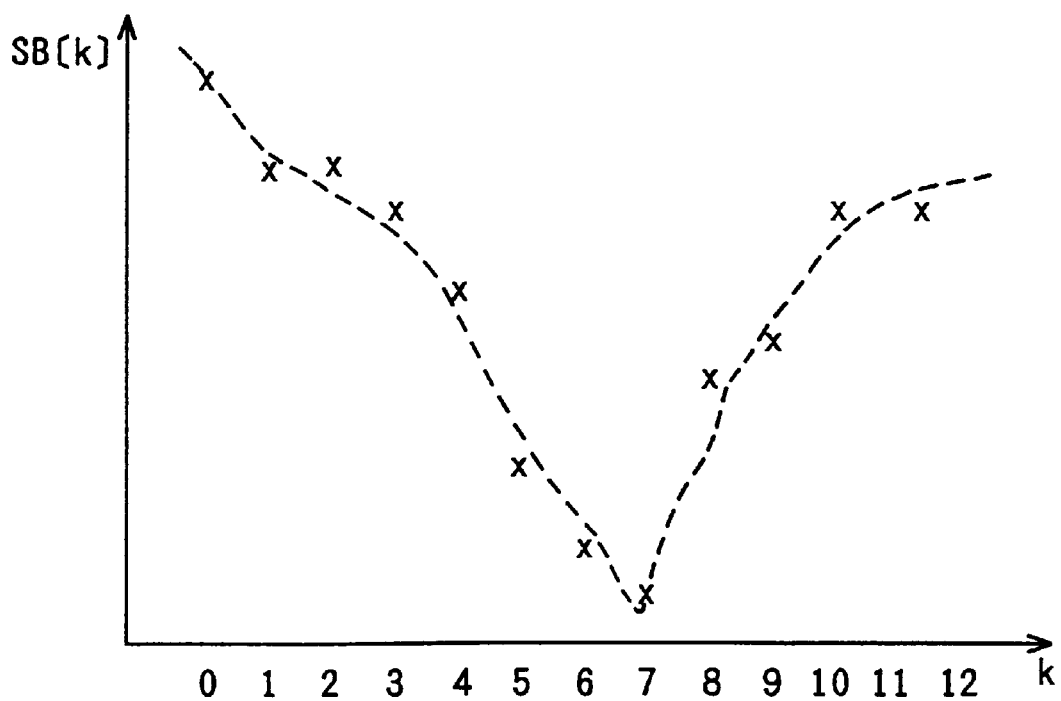

FIG. 7A is a graph of the first correlation value sequence SA[k]($0 \leq k \leq 12$) in coordinate system in which a horizontal axis represents correlation numbers and a vertical axis represents correlation values, whereas FIG. 7B is a graph of the second correlation value sequence SB[k] ($0 \leq k \leq 12$) in similar coordinate system. In FIG. 7A, the first correlation value sequence SA[k]($0 \leq k \leq 12$) is represented by the mark "○". In FIG. 7B, the second correlation value sequence SB[k]($0 \leq k \leq 12$) is represented by the mark "X". Broken lines in FIGS. 7A and 7B are true values expressed in an analog way.

In the case of the image frame as shown in FIG. 4A, a minimum value of the first correlation value sequence SA[k]($0 \leq k \leq 12$) is seen to be SA[6] (k=6) from FIGS. 5B and 7A, and a minimum value of the second correlation value sequence SB[k]($0 \leq k \leq 12$) is seen to be SB[7] (k=7) from FIGS. 6C and 7B.

Accordingly, by performing the second correlation calculation in addition to the first correlation calculation, another distance information, i.e., the minimum value SB[7] can be obtained in addition to the minimum value SA[6].

C: Calculation of First and Second Distance Data DA, DB:

1. Calculation of First Distance Data DA

The MPU 8 operates a first distance calculation to calculate first distance data DA. In other words, the MPU 8 calculates k at which first correlation value SA[k] is at minimum and first correlation CA[k]($0 \leq k \leq 12$) given by Equation (3) is at minimum.

$$CA[k] = |SA[k] - \tfrac{1}{2} \times |SA[k+1] - SA[k-1]|| \quad (3)$$

The MPU 8 calculates the first distance data DA by an interpolation calculation given by Equation (4) using first correlation values SA[k−1], SA[k] and SA[k+1] specified by k thus obtained.

In the case of SA[k−1]>SA[k+1], $$DA = k + \frac{SA[k-1] - SA[k+1]}{2 \times (SA[k-1] - SA[k])}$$

In the case of SA[k−1]<SA[k+1], $$DA = k - \frac{SA[k+1] - SA[k-1]}{2 \times (SA[k+1] - SA[k])} \quad (4)$$

2. Calculation of Second Distance Data DB

The MPU 8 operates a second distance calculation to calculate second distance data DB. In other words, the MPU 8 calculates k at which second correlation value SB[k] is at minimum and second correlation CB[k]($0 \leq k \leq 12$) given by Equation (5) is at minimum.

$$CB[k] = |SB[k] - \tfrac{1}{2} \times |SB[k+1] - SB[k-1]|| \quad (5)$$

The MPU 8 calculates second distance data DB by an interpolation calculation given by Equation (6) using second correlation values SB[k−1], SB[k] and SB[k+1] specified by k thus obtained.

In the case of SB[k−1]>SB[k+1], $$DB = k + \frac{SB[k-1] - SB[k+1]}{2 \times (SB[k-1] - SB[k])}$$

In the case of SB[k−1]<SB[k+1], $$DB = k - \frac{SB[k+1] - SB[k-1]}{2 \times (SB[k+1] - SB[k])} \quad (6)$$

D: Calculation of Final Distance Data:

Subsequently, the MPU 8 calculates an average value (DA+DB)/2 as final distance data using the first and second distance data DA, DB given by Equations (4) and (6).

E: Generation of Drive Signal:

Thereafter, the MPU 8 generates a drive signal used to drive the taking lens 7 based on the calculated average value and sends it to the driver 9.

In this way, there can be realized the image pickup apparatus 1 having an improved focusing ability for the image frame shown in FIG. 4A.

In this embodiment, the first correlation value sequence SA[k]($0 \leq k \leq 12$) and the second correlation value sequence SB[k]($0 \leq k \leq 12$) are both calculated in the entire range of $0 \leq k \leq 12$. Either one of the first and second correlation value sequences SA[k]($0 \leq k \leq 12$) and SB[k]($0 \leq k \leq 12$) may be calculated in a partial range of $0 \leq k \leq 12$ including the value of k at which the other is at minimum.

For example, in the case that the first correlation value sequence SA[k] is calculated in the entire range of $0 \leq k \leq 12$ in FIG. 7A, the second correlation value sequence SB[k] may be calculated only in the range of $3 \leq k \leq 9$ or $5 \leq k \leq 9$ which is set based on k=6 at which SA[k] is at minimum.

Next, a modification suitable for metering a distance to an object shown in FIG. 8A will be described. This modification is conceptionally identical to the foregoing embodiment except for the final distance data calculation. Accordingly, only a final distance data calculation in this modification is described.

Figure 8A:
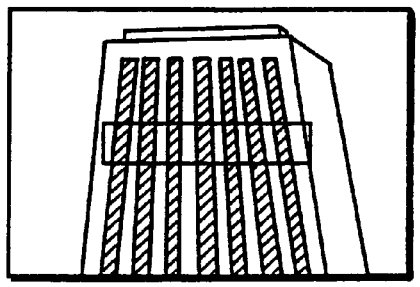
FIG. 8A is a diagram showing an exemplary image frame having a repetition pattern image.
Figure 8B:
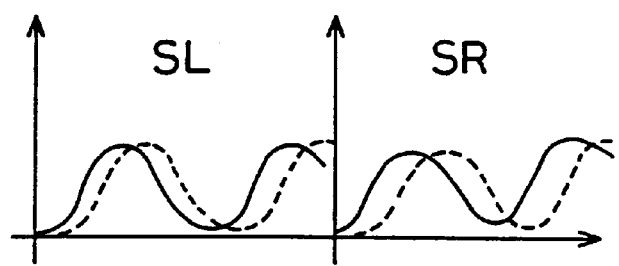
FIG. 8B is a chart showing waveforms of object images of FIG. 8A obtained by the sensor.

FIG. 8A is a diagram showing an exemplary image frame in which a repetition pattern image appears unlike the frame shown in FIG. 4A. FIG. 8B is waveform charts of object images of FIG. 8A picked up by the sensors 2L, SR. In FIG. 8B, solid line represents waves given by SA[3] and broken line represents waves given by SA[8].

Figure 9A:
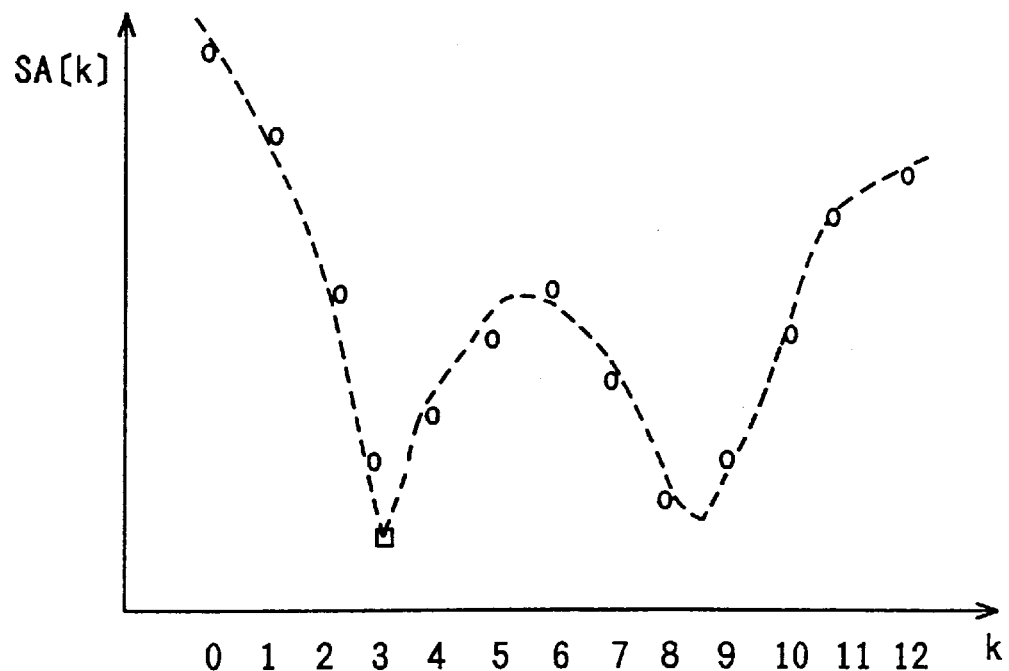
FIGS. 9A and 9B are graphs showing a first correlation value sequence SA[k]($0 \leq k \leq 12$) and a second correlation value sequence SB[k]($0 \leq k \leq 12$), respectively, in the case of FIG. 8A.
Figure 9B:
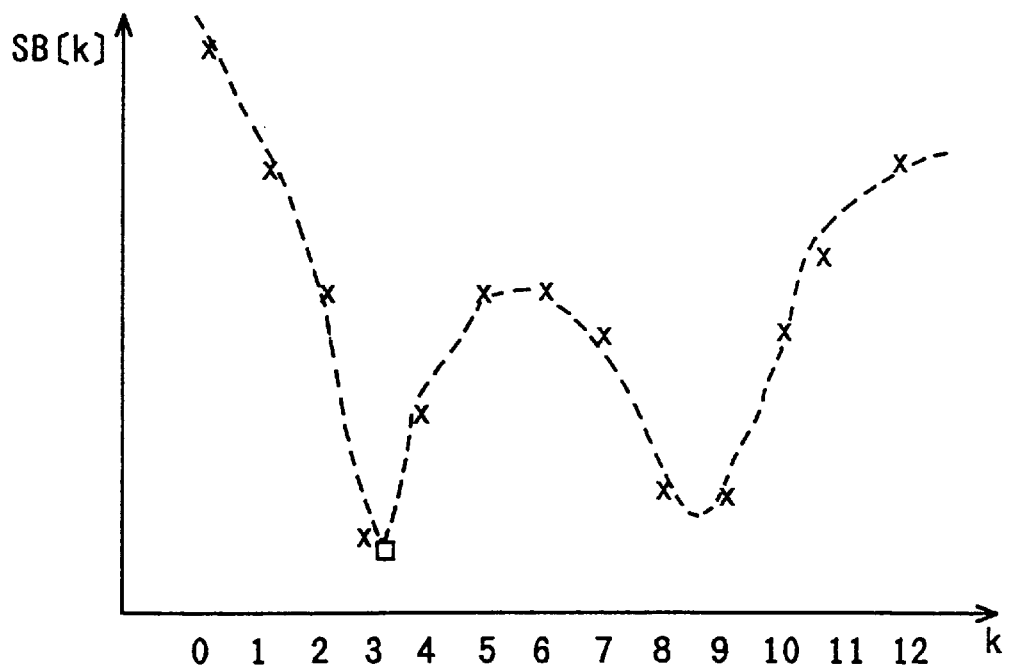

FIG. 9A is a graph showing a first correlation value sequence SA[k]($0 \leq k \leq 12$) obtained by measurement from the image frame of FIG. 8A in coordinate system having correlation number in horizontal axis and correlation values in vertical axis, whereas FIG. 9B is a graph showing a second correlation value sequence SB[k]($0 \leq k \leq 12$) obtained by measurement from the image frame of FIG. 8A in similar coordinate system. The first correlation value sequence SA[k]($0 \leq k \leq 12$) is represented by the mark "○" in FIG. 9A and the second correlation value sequence SB[k] ($0 \leq k \leq 12$) is represented by the mark "X" in FIG. 9B. It should be noted that broken lines in FIGS. 9A, 9B are true values represented in an analog way and the mark "□" represents a true point of coincidence.

As shown in FIG. 9A, the minimum value of the first correlation value sequence SA[k] is where k=3 in the range of $0 \leq k \leq 5$ and is located in vicinity of the true point of coincidence, but is larger than SA[8] which is the minimum value of the first correlation value sequence SA[k] in the range of $6 \leq k \leq 12$. Thus, the minimum value of the first correlation value sequence SA[k]($0 \leq k \leq 12$) is where k=8. On the other hand, the minimum value of the second correlation value sequence SB[k]($0 \leq k \leq 12$) is where k=3 in FIG. 9B. Such an error occurs because the sensors 2L, 2R shown in FIG. 1 pick portions of the focused image in discrete positions at intervals of pixels determined by the pixel density as pixel signals. Thus, even a slight difference in data extraction (shifting) is liable to cause a large difference in the pixel data included in the data series DL, DR extracted from the left and right data series SL, SR, for example, as shown in FIGS. 5A and 6A. The above error is also subject to a quantization step of the AD converter of the image processor 6.

In view of the above, the MPU 8 calculates distance data DD by Equation (7) as final distance data in this modification.

In the case of SA[k]<SB[k], DD=DA

In the case of SA[k]>SB[k], DD=DB (2)

Since SA[8]>SA[3] in the case of FIG. 9, the MPU 8 calculates the distance data DD=DB as final distance data.

Next, a second modification will be described. In this modification, the MPU 8 calculates a third correlation value sequence SC[k]($0 \leq k \leq 12$) by adding the respective values of the first correlation value sequence SA[k]($0 \leq k \leq 12$) and those of the second correlation value sequence SB[k] ($0 \leq k \leq 12$) as in Equation (8).

$$SC[k] = SA[k] + SB[k] \quad (8)$$

Figure 10:
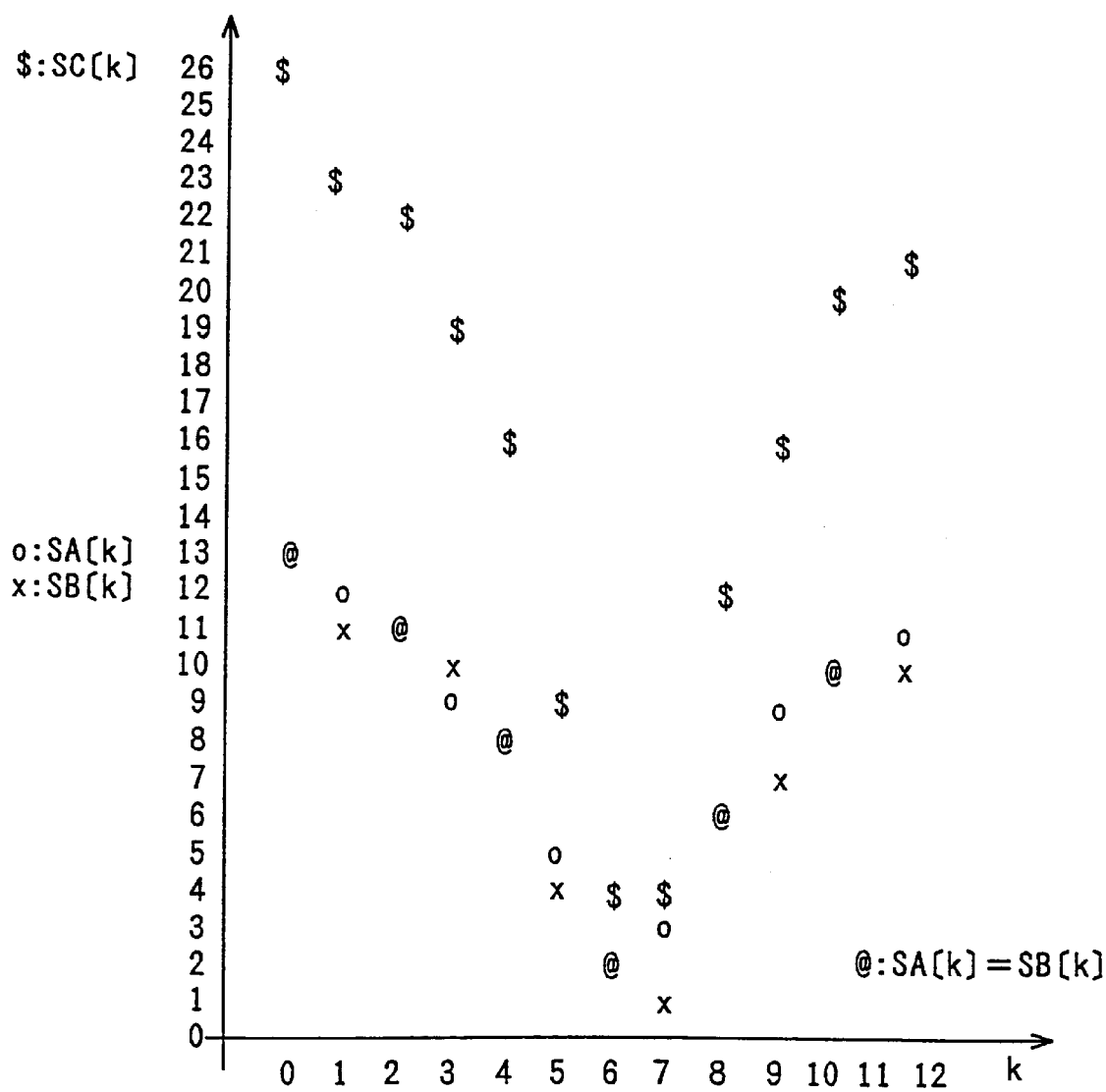
FIG. 10 is a graph showing a first correlation value sequence SA[k]($0 \leq k \leq 12$), a second correlation value sequence SB[k]($0 \leq k \leq 12$), and a third correlation value sequence SC[k]($0 \leq k \leq 12$)

FIG. 10 is a graph showing the first correlation value sequence SA[k]($0 \leq k \leq 12$), the second correlation value sequence SB[k]($0 \leq k \leq 12$), and the third correlation value sequence SC[k]($0 \leq k \leq 12$) in the same coordinate system. In FIG. 10, the mark "○" represents the respective values of the first correlation value sequences SA[k]($0 \leq k \leq 12$), the mark "X" represents those of the second correlation value sequences SB[k](0≦k≦12), and the mark "$" represents those of the third correlation value sequences SC[k] (0≦k≦12). Cases where the first and second correlation value sequences SA[k] and SB[k] coincide are represented by the mark "@".

The MPU 8 calculates k at which the SC[k] is at minimum and correlation CC[k](0≦k≦12) given by Equation (9) is at minimum.

$$CC[k]=SC[k]-\tfrac{1}{2}\times|SC[k+1]-SC[k-1]| \qquad (9)$$

The MPU 8 calculates distance data DC by an interpolation calculation given by Equation (10) using correlation values SC[k-1], SC[k] and SC[k+1] specified by k thus obtained.

In the case of SC[k-1]>SC[k+1], $$DC = k + \frac{SC[k-1] - SC[k+1]}{2 \times (SC[k-1] - SC[k])}$$

In the case of SC[k-1]<SC[k+1], $$DC = k - \frac{SC[k+1] - SC[k-1]}{2 \times (SC[k+1] - SC[k])} \qquad (10)$$

Next, a second embodiment of the invention will be described. A distance meter of the second embodiment has basically identical construction to the first embodiment except for that address designation is executed so as to provide reference and comparison sections.

Figure 11:
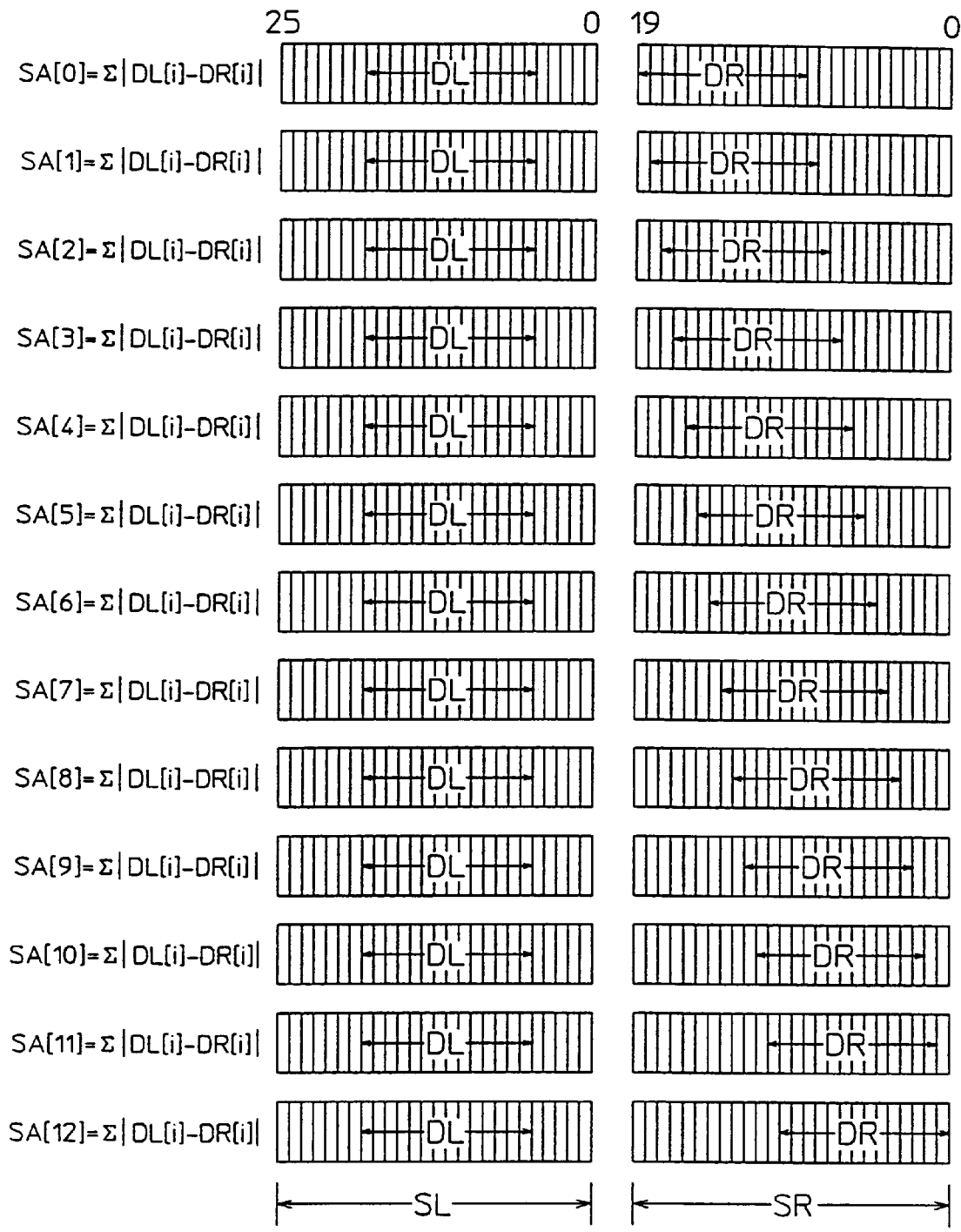
FIG. 11 is a diagram showing how left and right pixel addresses are designated so that the left and right sensors are used as reference and comparison sections, respectively, and showing a first data extraction in a second embodiment of the invention.

Specifically, FIG. 11 shows a first address designation, that is, how left and right pixel addresses are designated so that a sensor 2L acts as a reference section and a sensor 2R acts as a comparison section. In the first address designation, the left address of "5" is constantly designated to make the sensor SL a reference section while the right pixel address in the order to "12", "11", . . . "0" are designated to make the sensor SR a comparison section. Here, it is assumed that SA[6] be at minimum in the case that the first correlation value sequence SA[k](0≦k≦12) is calculated in the same manner as the foregoing embodiments.

Figure 12:
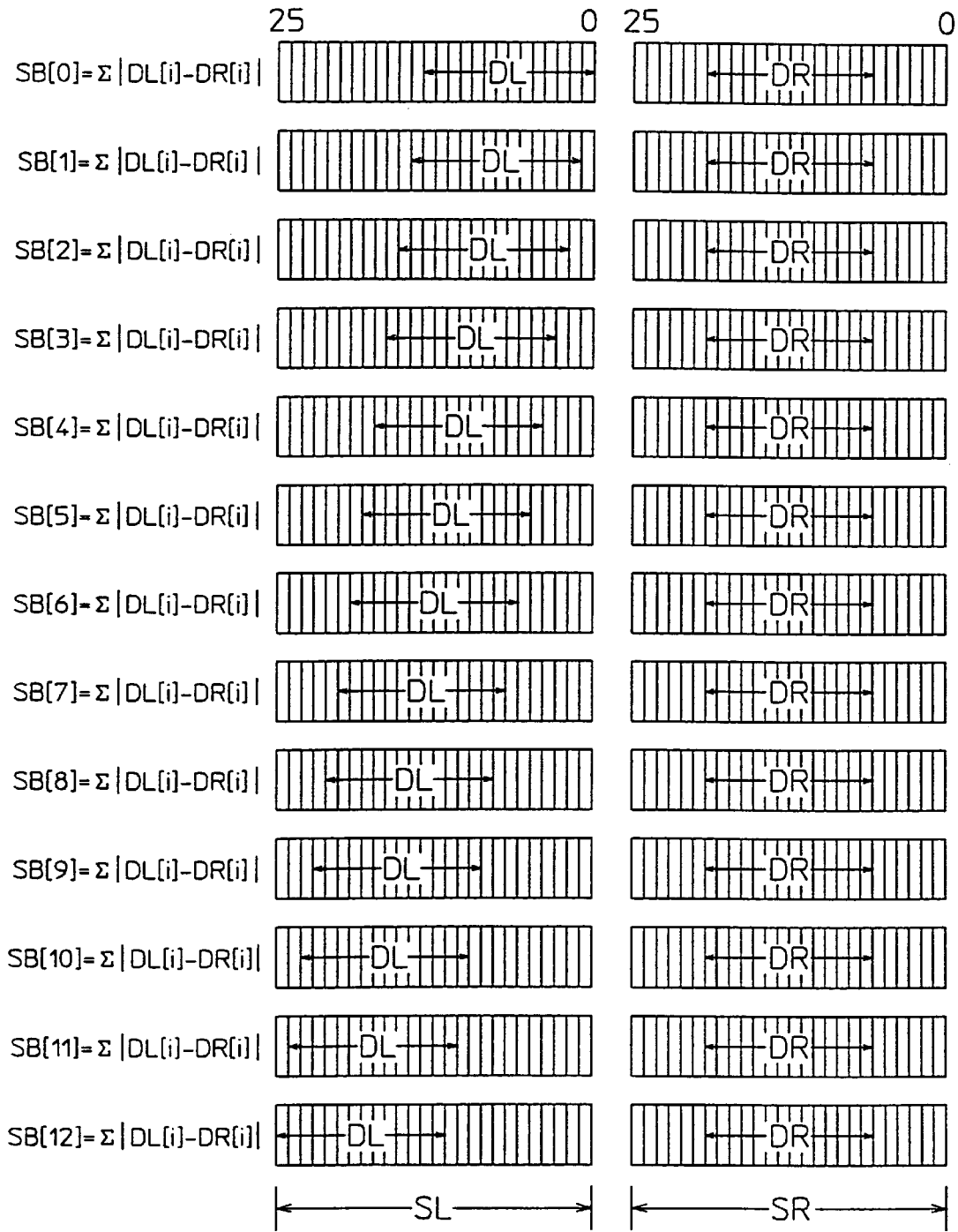
FIG. 12 is a diagram showing how left and right pixel addresses are generated in the case that the left and right sensors are used as comparison and reference sections, respectively, and showing a second data extraction in the second embodiment.

On the other hand, FIG. 12 shows a second address designation, that is, how left and right pixel addresses are designated so that the sensors SL acts as a comparison and the sensor 2R acts as a reference section. In the second address designation, the left and right pixel addresses are so designated as to include a combination of the data series DL, DR when SA[6] which is at minimum in FIG. 11. In other words, the comparison section when the first correlation value sequence SA[k](0≦k≦12) is at minimum acts as a reference section, and the other acts as a comparison section. In the example of FIG. 12, in the second address designation, the left pixel addresses in the order of "0", "1", . . . "12" are designated while the right pixel addresses of "6" are designated. The second correlation value sequence SB[k](0≦k≦12) is calculated in the same manner as the foregoing embodiments.

Consequently, two distance data are obtained and final distance data is calculated in the same manner as the first embodiment.

In the foregoing embodiment, the distance metering is performed by the MPU 8 in accordance with the loaded operation program. However, it may be appreciated to perform distance metering in an arrangement shown in FIG. 13.

Figure 13:
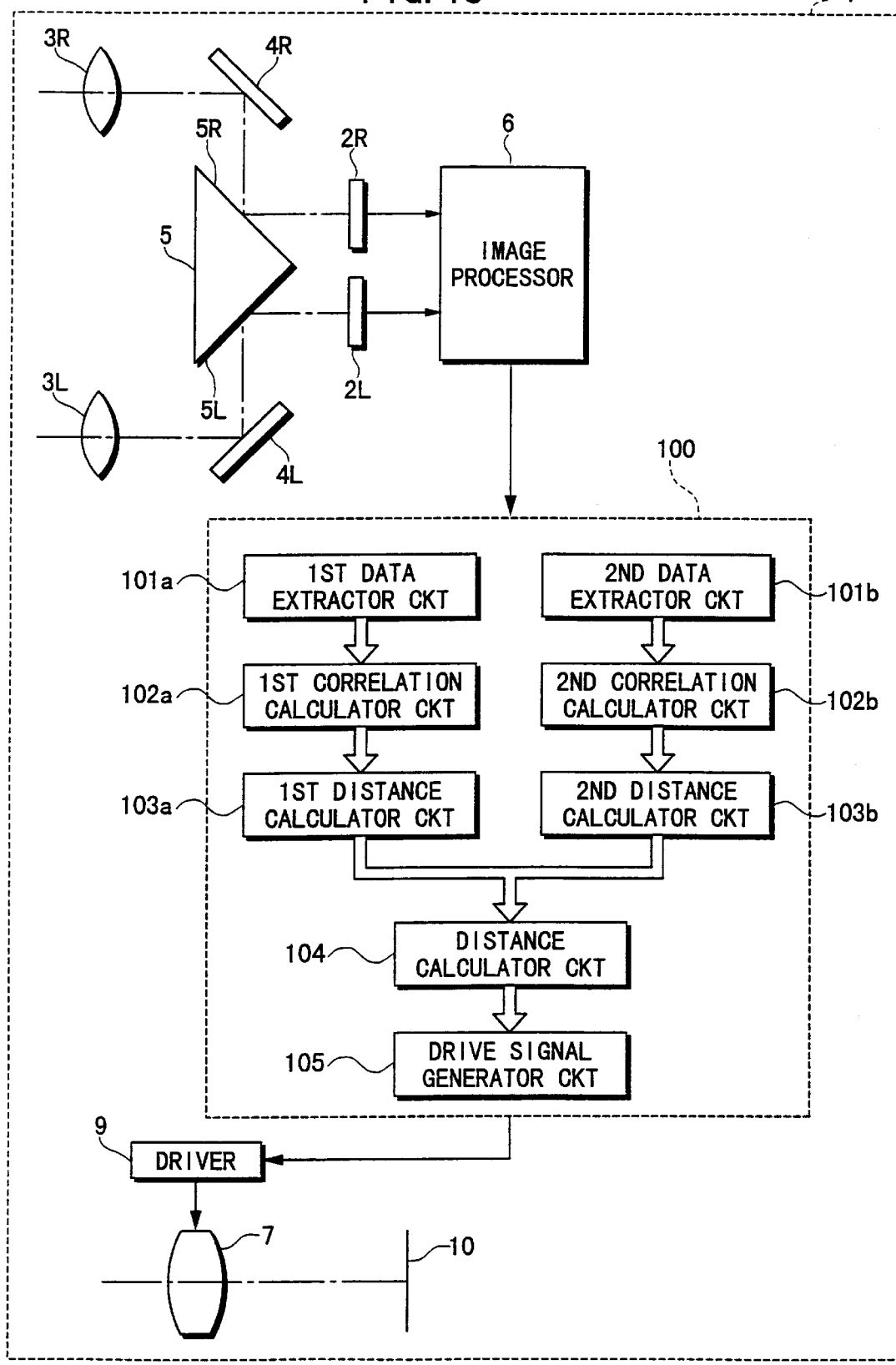
FIG. 13 is a diagram showing a construction of another image pickup apparatus embodying the invention, the image pickup apparatus being provided with another distance meter.
Figure 14:
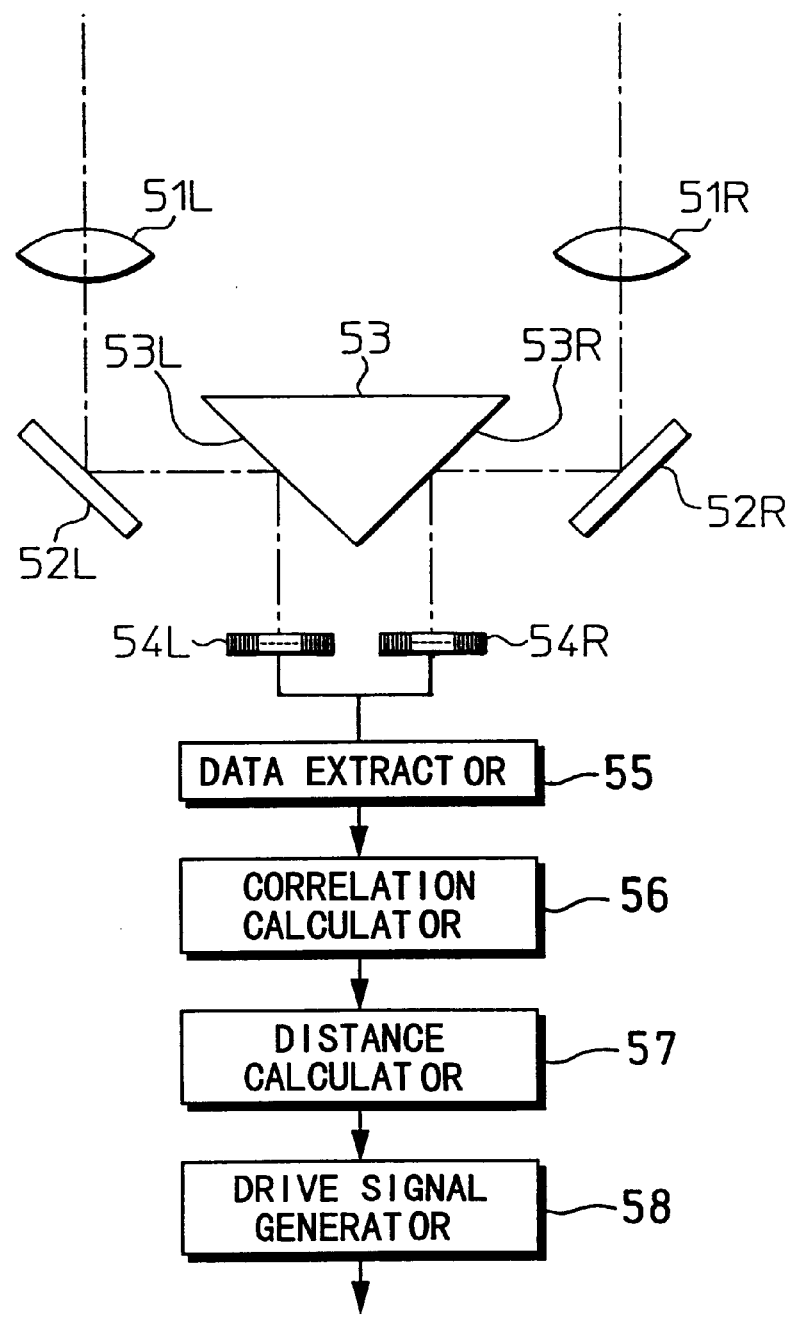
FIG. 14 is a diagram showing a construction of a conventional distance meter.

Specifically, in FIG. 13, there is provided a distance calculation unit 100 which includes a first data extractor circuit 101a, a second data extractor circuit 101b, a first correlation calculator circuit 102a, a second correlation calculator circuit 102b, a first distance calculator circuit 103a, a second distance calculator circuit 103b, a distance calculator circuit 104, and a drive signal generator circuit 105.

The first data extractor circuit 101a successively designates left and right address in the same sequences as the sequence of "A-1: First Data Extraction" at the same time to extract data series DL, DR (first data series) from the left and right data series SL, SR in accordance with left and right pixel addresses AL, AR. The first correlation calculator circuit 102a calculates a first correlation value sequences SA[k](0≦k≦12) based on pixel data DL[i], DR[i] extracted in the i-(0≦i≦13)th place from the first data series. The first distance calculator circuit 103a calculates k at which SA[k] is at minimum and the correlation CA[k](0≦k≦12) given by Equation (3) is at minimum, and distance data DA by the interpolation calculation given by Equation (4) using correlation values SA[k-1], SA[k] and SA[k+1] specified by k thus obtained.

Similarly, the second data extractor circuit 101b successively designates left and right address in the same sequences as the sequence of "B-1: Second Data Extraction" at the same time to extract data series DL, DR (second data series) from the left and right data series SL, SR in accordance with left and right pixel addresses AL, AR. The second correlation calculator circuit 102b calculates a second correlation value sequences SB[k](0≦k ≦12) based on pixel data DL[i], DR[i] extracted in the i-(0≦i≦13)th place from the second data series. The second distance calculator circuit 103b calculates k at which SB[k] is at minimum and the correlation CB[k](0≦k≦12) given by Equation (5) is at minimum, and distance data DB by the interpolation calculation given by Equation (6) using correlation values SB[k-1], SB[k] and SB[k+1] specified by k thus obtained.

Thereafter, the distance calculator circuit 104 calculates final distance data based on the distance data DA, DB. Subsequently, the drive signal generator circuit 105 generates a drive signal to drive a taking lens 7 in accordance with final distance data obtained by the distance calculator circuit 104.

In the foregoing embodiments and modifications, first and second data extractions are executed. However, according to the present invention, it may be appreciated to execute a third or more data extractions to increase the measurement accuracy.

As is clear from the above description, the distance meter makes it possible to obtain highly accurate distance measurement data because distance calculation is executed based on the first and second correlation values obtained by the first and second data extractions.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An apparatus comprising:
   a detecting device which includes a first sensor having arrayed pixels and a second sensor having arrayed pixels;
   a selector which selects predetermined pixels within said first and said second sensors;
   a controller which controls said selector so that a first shift manner and a second shift manner are alternately repeated, wherein the first shift manner is so executed that selected pixels of said first sensor are fixed and selected pixels of said second sensor are shifted by one pixel, and the second shift manner is so executed that selected pixels of said second sensor are fixed and selected pixels of said first sensor are shifted by one pixel, wherein said controller controls said selector so that said selector starts said repetition with said first manner in a first situation to generate first outputs, and said selector starts said repetition with said second manner in a second situation to generate second outputs; and a calculator which calculates correlations based on the first and second outputs from said selected pixels, and calculates an object distance based on the calculated correlations.

2. The apparatus as claimed in claim 1, wherein said apparatus is an image pickup apparatus having a taking lens for providing an object image focused on a photosensitive film based on the object distance.

3. The apparatus as claimed in claim 1, wherein said calculator calculates a first distance data based on a first group of correlation values obtained in a first situation and calculates a second distance data based on a second group of correlation values obtained in a second situation, and wherein said calculator takes the average of the first and the second distance data to obtain said object distance.

4. The apparatus as claimed in claim 3, wherein said calculator compares a minimum value of the first group of correlation values and a minimum value of the second group of correlation values, and calculates said object distance by means of the smaller minimum value.

5. The apparatus as claimed in claim 3, wherein said calculator calculates said object distance based on a third group of correlation values obtained by adding each value of said first group of correlation values and a corresponding value of said second group of correlation values.

6. An apparatus comprising:
a detecting device which includes a first sensor having arrayed pixels and a second sensor having arrayed pixels;
a selector which selects predetermined pixels within said first and second sensors;
a controller which controls said selector so that, in a first situation, selected pixels of said first sensor are fixed and selected pixels of said second sensor are shifted by one pixel to generate first outputs, and, in a subsequent second situation, selected pixels of said second sensor are fixed and selected pixels of said first sensor are shifted by one pixel to generate second outputs; and
a calculator which calculates correlations based on the first and second outputs from said selected pixels, and calculates an object distance based on the calculated correlations.

7. The apparatus as claimed in claim 6, wherein said apparatus is an image pickup apparatus having a taking lens for providing an object image focused on a photosensitive film based on the object distance.

8. The apparatus as claimed in claim 6, wherein said calculator calculates a first distance data based on a first group of correlation values obtained in a first situation and calculates a second distance data based on a second group of correlation values obtained in a second situation, and wherein said calculator takes the average of the first and the second distance data to obtain said object distance.

9. The apparatus as claimed in claim 8, wherein said calculator compares a minimum value of the first group of correlation values and a minimum value of the second group of correlation values, and calculates said object distance by means of the smaller minimum value.

10. The apparatus as claimed in claim 8, wherein said calculator calculates said object distance based on a third group of correlation values obtained by adding each value of said first group of correlation values and a corresponding value of said second group of correlation values.

11. The apparatus as claimed in claim 1, wherein said calculator calculates first distance data based on a first group of correlation values obtained in said first shift situation and calculates second distance data based on a second group of correlation values obtained in said second shift situation, and wherein said calculator calculates the object distance based on said first distance data and said second distance data.

12. The apparatus as claimed in claim 11, wherein said calculator calculates an average of the first and the second distance data to obtain said object distance.

13. The apparatus as claimed in claim 12, wherein said calculator compares a minimum value of the first group of correlation values and a minimum value of the second group of correlation values, and calculates said object distance by means of the smaller minimum value.

14. The apparatus as claimed in claim 12, wherein said calculator calculates said object distance based on a third group of correlation values obtained by adding each value of said first group of correlation values and a corresponding value of said second group of correlation values.

15. The apparatus as claimed in claim 6, wherein said calculator calculates first distance data based on a first group of correlation values obtained in said first situation and second distance data based on a second group of correlation values obtained in said second situation, and wherein the calculator calculates the object distance based on said first distance data and said second distance data.

16. The apparatus as claimed in claim 15, wherein said calculator calculates an average of the first and the second distance data to obtain said object distance.

17. The apparatus as claimed in claim 16, wherein said calculator compares a minimum value of the first group of correlation values and a minimum value of the second group of correlation values, and calculates said object distance by means of the smaller minimum value.

18. The apparatus as claimed in claim 16, wherein said calculator calculates said object distance based on a third group of correlation values obtained by adding each value of said first group of correlation values and a corresponding value of said second group of correlation values.

19. A method for calculating an object distance comprising:
detecting image data with a first sensor having arrayed pixels and a second sensor having arrayed pixels;
selecting predetermined pixels within said first and second sensors;
alternately repeating a first shift manner and a second shift manner with a controller, wherein the first shift manner is so executed that selected pixels of said first sensor are fixed and selected pixels of said second sensor are shifted by one pixel, and the second shift manner is so executed that selected pixels of said second sensor are fixed and selected pixels of said first sensor are shifted by one pixel, wherein said controller controls said selector so that said selector starts said repetition with said first manner in a first situation, and said selector starts said repetition with said second manner in a second situation;

calculating a correlation based on outputs from said selected pixels; and calculating an object distance based on the calculated correlation.

20. The method of claim 19 further comprising:

calculating first distance data based on a first group of correlation values obtained in said first situation and second distance data based on a second group of correlation values obtained in a second situation; and calculating the object distance based on said first distance data and said second distance data.

* * * * *